(12) United States Patent
Nakamura

(10) Patent No.: US 6,345,892 B2
(45) Date of Patent: Feb. 12, 2002

(54) SUNGLASSES WITH READILY DETACHABLE LENS

(75) Inventor: Eio Nakamura, Sabae (JP)

(73) Assignee: Real Vision Co., Ltd., Fukui (JP)

( * ) Notice: Subject to any disclaimer, the term of this patent is extended or adjusted under 35 U.S.C. 154(b) by 0 days.

(21) Appl. No.: 09/820,744

(22) Filed: Mar. 30, 2001

(30) Foreign Application Priority Data

Apr. 5, 2000 (JP) ........................................ 2000-103093

(51) Int. Cl.$^7$ ................................................ G02C 1/04
(52) U.S. Cl. ......................... 351/103; 351/44; 351/109; 351/138
(58) Field of Search .......................... 351/44, 103, 105, 351/106, 107–109, 51, 138, 130, 131, 132

(56) References Cited

U.S. PATENT DOCUMENTS 4,102,566 A * 7/1978 Shelton ...................... 351/103
5,796,460 A * 8/1998 Maturaporn .................. 351/86

FOREIGN PATENT DOCUMENTS

FR 2 585 141 A1 * 1/1987 .................. 351/103

OTHER PUBLICATIONS

Japanese Patent Office, Japanese Utility Model Publication No. 7–20654, Publication Date: May 15, 1995, Application No. 1–106937, Filing Date: Sep. 12, 1989, pp. 1–6. (English translation of sole claim provided).

Japanese Patent Office, Japanese Utility Model Application Laid–Open No. 6–82624, Publication Date: Nov. 25, 1994, Application No. 5–22659, Filing Date: Apr. 28, 1993 (Abstract only with English translation).

* cited by examiner

Primary Examiner—Huy Mai
(74) Attorney, Agent, or Firm—Snider & Associates; Ronald R. Snider

(57) ABSTRACT

Sunglasses whose lens is stably engaged to a frontal bar while can be easily replaced with another lens when necessary is provided, said sunglasses being light in weight with minimum production parts and sophisticated in design as well. The sunglasses of this invention comprises a frontal bar made of a thin rod material, a longitudinal lens plate supported on said bar, the respective temples axially supported on each end of said bar such that they are collapsible, a nose pad suspended from the middle portion of said bar to the ocular side of said bar, a hook suspended to the frontal side of said bar and a locking means to detachably interlock the respective upper fringes of said lens plate with said bar. In spite of the fact that the sunglasses of this invention is superb in shape stability, its structure is so simple with minimum production parts, production cost is reduced to quite an extent. Besides, the wearers are able to freely select a sunglass lens of different characteristics and design according to the type of activity where they engage.

6 Claims, 7 Drawing Sheets

SUNGLASSES WITH READILY DETACHABLE LENS

RELATED APPLICATION

The present application claims the priority of the Japanese Patent Application No. 2000-103093 filed on Apr. 5, 2000

BACKGROUND OF THE INVENTION

1. Technical Field

The present invention relates to the improvement of the sunglasses, in more details, pertaining to a mechanism for attaching and detaching the lens thereof wherein it enables the variety of sunglasses lens with various optical characteristics such as antiglare and photochromism to be easily exchanged with one another according to the type of activity where the wearers engage such as mountaineering, skiing and fishing.

2. Prior Art

Conventionally, such sunglasses are known as holding its lens into place by thrusting a protrusion disposed on the upper part of the nose pad into an aperture opened in the lens surface and elastically inserting said protrusion into the corresponding aperture opened on the surface of a frontal bar as well as by mounting the lower fringe middle portion of the lens into the groove provided on the circumferential surface of the ridge portion of the nose pad (as referred to the Japanese Utility Model Publication No.7-20654) and further adding to the above holding method a means to mount the respective fringe portions of the lens into the corresponding grooves of the receiving members disposed on the respective ends of the frontal bar (as referred to the Japanese Utility Model Application Laid-open No.6-82624).

However, the more the number of parts for holding the lens into place increases, the more the lens supporting portions becomes bulky. It ruins the visibility and the shapeliness of the sunglasses, thus, inviting a number of complaints from both function-minded and fashion-conscious wearers.

Upon the replacement of the lens with another type of lens having different characteristics such as polarization of light, absorption of ultraviolet rays and attenuation of light or upon the replacement thereof due to damage inflicted thereupon, it takes more time and labor than expected to replace one type or the lens or a broken lens with another because such replacement has been carried out after removing said nose pad, thus, the corrective measures against such inconvenience having been sought after.

Further, the conventionally well-known lens holding mechanism for the sunglasses is intended for stably holding the lens with the restraint of its undesirable vertical, horizontal as well as back and forth movements, which complicates such mechanism and requires high precision upon assemblage. As a result of it, the production cost increases along with the rise of the unit price of the assembling parts, which unavoidably leads to the high price of the sunglasses.

DISCLOSURE OF THE INVENTION

In view of the above inconveniences or issues to be solved with regard to the replacement and exchange of the lens of the sunglasses, the present invention is to provide a pair of sunglasses whose lens is easy and fast to be replaced and exchanged.

Also, it is to provide a pair of shapely sunglasses whose parts for holding the lens into place are simplified while whose lens is stably and securely held into place.

Moreover, it is to provide a replacement mechanism wherein it enables a damaged lens (scratched, split or deformed) to be economically replaced with a new one.

The technical means adopted herein to solve the above issues is as follows. That is to say, the present invention is characterized in realizing a pair of sunglasses comprising a frontal bar molded of a thin rod material such that it aligns the eyebrows of a human face, a longitudinal lens plate supported on said frontal bar and shaped with a size enough to cover both eyes, a temple axially supported on the respective ends of said frontal bar such that it is collapsible and a nose pad suspended from the middle portion of said frontal bar to the ocular side of said bar wherein a hook that retains the frontal upper surface of said lens plate is arranged in front of the middle portion of said bar and the respective upper portions of said lens plate are detachably fastened onto said frontal bar with a locking means. Said locking means may be a pin-shaped structure to interlock said frontal bar with said lens plate by thrusting said structure through the apertures formed on said bar and the corresponding apertures formed on said lens plate or may be a small clip to interlock the upper fringe portions of the said bar with the lens plate. In short, said means can be anything that enables both end portions of the lens plate to be stably supported on the frontal bar in such a point clamping manner as mentioned above.

BEST MODE FOR CARRYING OUT THE INVENTION

Hereinafter, the best mode for carrying out the invention is described with reference to the accompanying drawings.
(First Embodiment)

Figure 1:
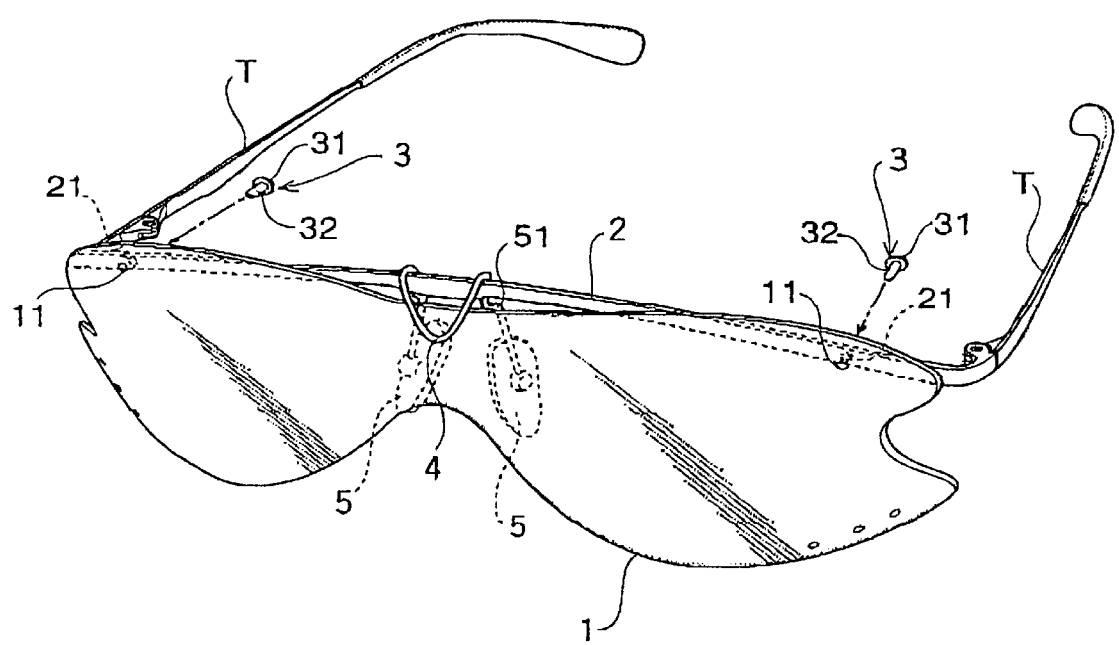
FIG. 1 is a perspective view of a pair of sunglasses of the first embodiment of the present invention.
Figure 2:
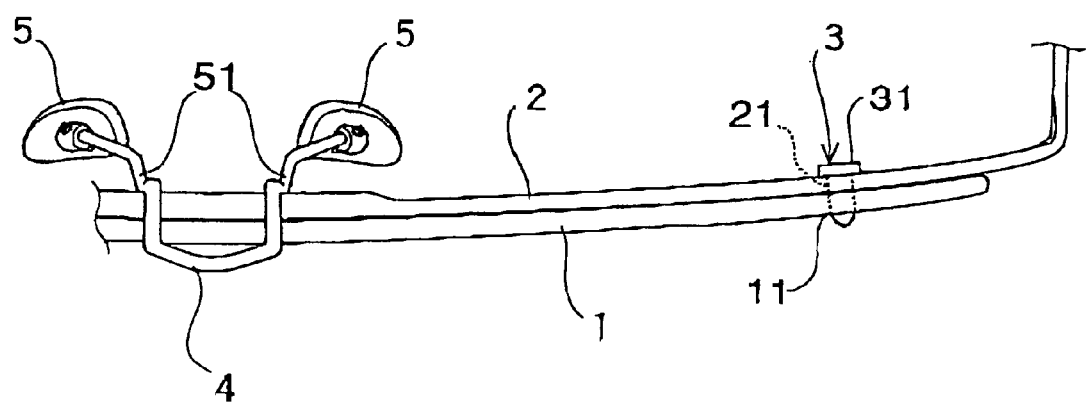
FIG. 2 is a partly enlarged plan view of the sunglasses of the first embodiment of the present invention showing the state where the lens plate is interlocked with the frontal bar.

FIGS. 1 and 2 show a pair of sunglasses of the first embodiment of the present invention. In the drawings, what is indicated with numeral 1 is a lens plate made of plastic and molded into longitudinal gourd-shaped configuration with its middle portion constricted inwards. This lens plate has a size enough to cover both eyes and slightly curves towards the ocular side of the lens. This lens plate 1 is colored in the same way as an ordinary sunglass lens for the attenuation of light transmission. What is indicated with numeral 2 is a frontal bar made of a thin metallic plate (a plate made from β-titanium in this embodiment) that is light in weight and rich in elasticity, which bar is molded into a size enough to bridge over the width of a wearer's face in alignment with his/her eyebrows, and the respective endmost portions of which bar curve extending towards the respective ears and at the respective ends of which bar the respective temples T and T are hinged such that they are collapsible. It should be noted that the respective apertures 11 and 11 are provided on the upper rim of said lens plate 1 while the corresponding locking holes 21 and 21 that opposedly face said apertures 11 and 11, when the lens proper 1 is positioned in a fixed place with regard to said frontal bar 2, are provided in the said frontal bar 2, so that the lens plate is stably interlocked with the frontal bar 2 via a locking means as mentioned below.

Then, what is indicated with numeral 3 is a locking means of rivet type to interlock said lens plate 1 with the frontal bar 2, which locking means is made of soft synthetic resin (polyethylene resin) and comprises a broadened head portion 31 and a shank portion 32.

Then, what is indicated with numeral 4 is a hook made of an elastic metallic wiring material to hold said lens plate 1 with attaching the frontal surface thereof and to retain the same against said frontal bar 2, which hook is attached in the middle portion of said bar and suspends downwards along the frontal surface of said lens plate 1 substantially in the form of the letter L. What is indicated with numeral 5 in the drawings is a nose pad made of soft synthetic resin (silicone rubber) and formed into an oval shape, which nose pad is mounted on the lower part of a pad arm 51 formed by extending said hook 4 towards the ocular side of the lens.

Sunglasses according to this embodiment are assembled by inserting the constricted portion of the lens plate 1 upwardly from the lower side of said hook 4 and abutting the respective apertures 11 and 11 onto the frontal surface of said bar 2 so as to coincide with the respective locking holes 21 and 21 of the latter and mounting the shank portion 32 of said locking means 3 through the coincided looking hole 21 and aperture 11. The lens plate 1 of the sunglasses as assembled this way is stably held into place with regard to the frontal bar 2, because the lens plate 1 is engaged to the frontal bar 2 by the three-points clamping system wherein the lens plate 1 is retained at its middle portion by the hook 4 while locked onto the respective ends of the frontal bar 2. When it is required to replace the lens plate 1 with another type of lens or exchange with a new piece of lens, all you have to do is to pull off said locking means 3 and 3 and mount back the new piece of lens to the frontal bar as mentioned above.

(Second Embodiment)

Figure 3:
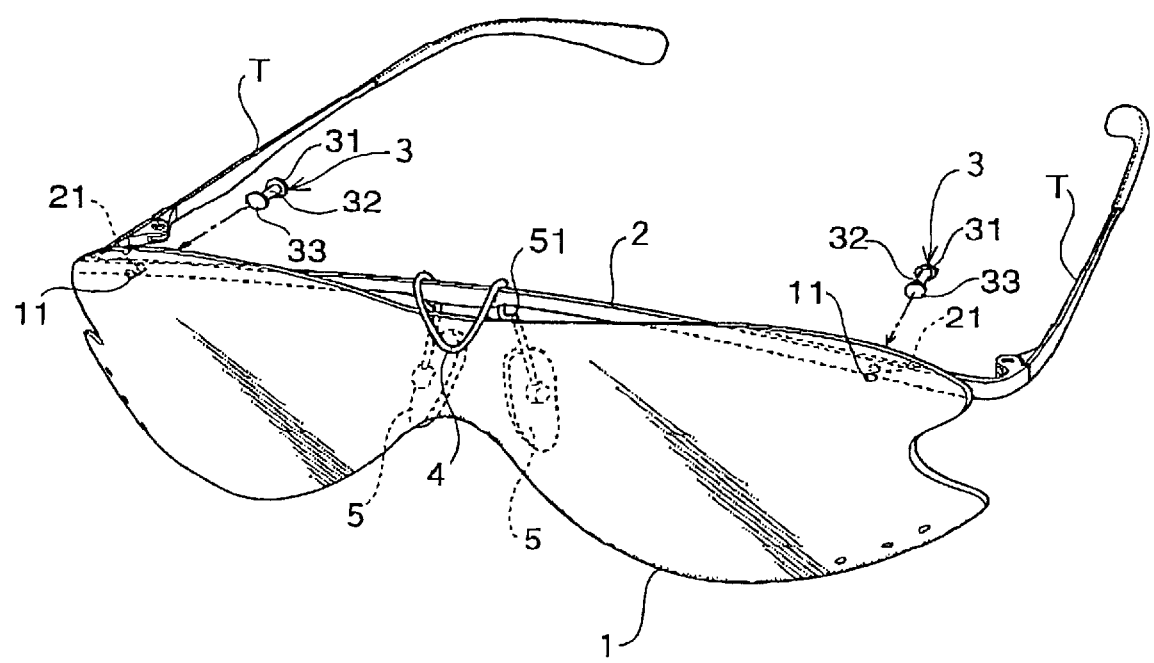
FIG. 3 is a perspective view of sunglasses of the second embodiment of the present invention.
Figure 4:
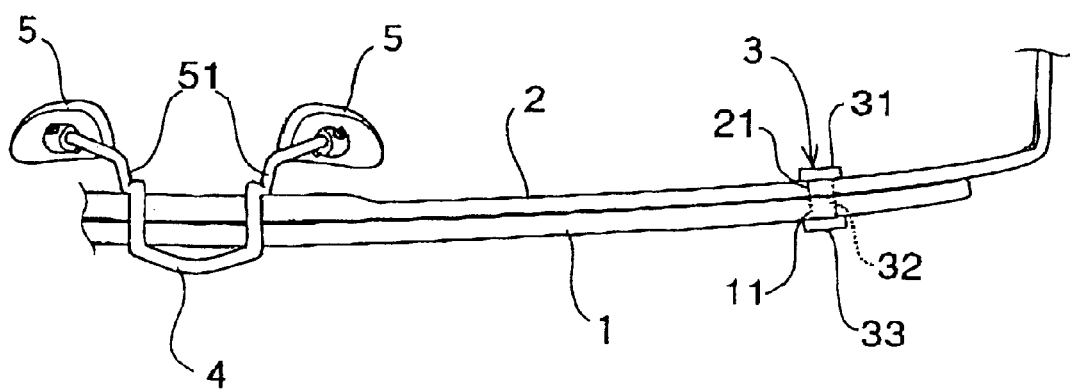
FIG. 4 is a partly enlarged plan view of a pair of sunglasses of the second embodiment showing the state where the lens plate is interlocked with the frontal bar.

FIGS. 3 and 4 show the sunglasses of this embodiment. The difference between the sunglasses of the present embodiment and the first one just lies in the shape of the locking means 3.

Namely, a locking means 3 of this embodiment is made of synthetic rubber (isobutylene-isoprene rubber) and molded substantially into a dumbbell shape, the respective ends of which shank portion 32 being provided with flange portions 31 and 33, respectively. The locking means 3 of this embodiment is characterized in that one flange portion 33 is elastically deformed upon its insertion into the coincided hole 21 and aperture 11 while upon its passage through said aperture said portion 33 recovers its original shape so as to prevent an inadvertent slip-off of said locking means 3. Thus, the sunglasses according to the present embodiment, wherein the lens plate 1 and frontal bar 2 are more firmly and stably engaged than those of the first embodiment, is suitable for heavy exercise accompanied with frequent vibrations.

(Third Embodiment)

Figure 5:
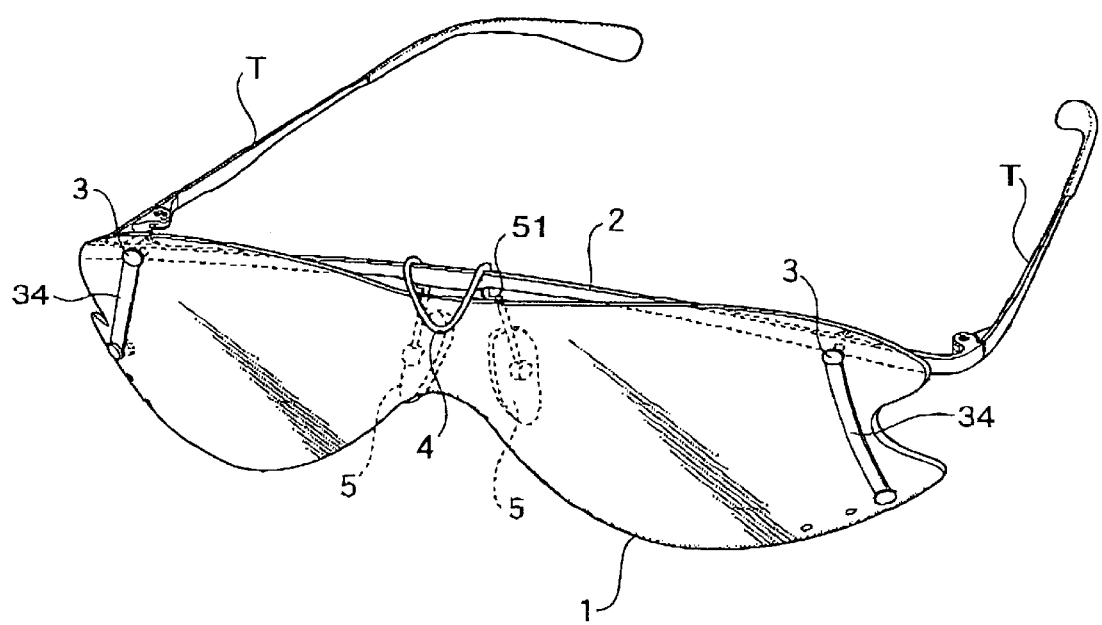
FIG. 5 is a perspective view of a pair of sunglasses of the third embodiment of the present invention.

FIG. 5 shows the sunglasses of this embodiment. The difference between the present embodiment and the second one lies in the decoration of the surface of the lens plate 1.

Namely, in this embodiment, a decoration tape 34 is attached on the respective right-and-left surfaces of the lens plate 1, which lens is mounted onto the frontal bar 2 in the same way as described in the above second embodiment. Such tape gives a personal touch to the sunglasses, so that the respective wearers are able to arrange their facial appearance as they like. Various kinds of color are in stock for such tape in accordance with various occasions, so that it can be replaced with another taking into considerations the contrast with the base color of the lens plate 1. It should be noted that on the backside of said tape a peelable adhesive is laminated so that said tape does not smudge the surface of said lens plate 1.

(Fourth Embodiment)

Figure 6:
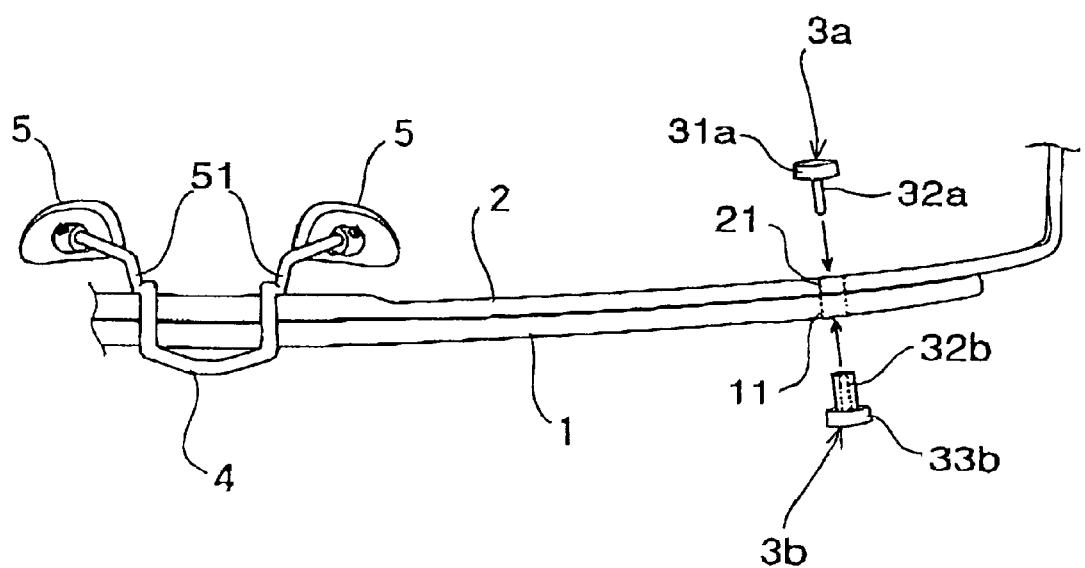
FIG. 6 is a partly enlarged view of a pair of sunglasses of the fourth embodiment of the present invention showing the state where the lens plate is interlocked with the frontal bar.

FIG. 6 shows the sunglasses of this embodiment. The basic arrangement of the sunglasses according to this embodiment is substantially the same as that of the sunglasses of the second embodiment, and the difference therebetween just lies in the arrangement of the locking means.

Namely, in this embodiment, the locking means to be used for clamping the lens 1 onto the frontal bar 2 comprises a pair of mounting and receiving members, which correspond to a plug piece 3a and a sleeved socket 3b, respectively. Said plug piece 3a comprises a head portion 31a and a shank portion 32a while said sleeved socket 3b comprises a socket portion 32b to receive said shank portion 32a and a head portion 33b.

The engagement via said locking means 3a and 3b between the lens 1 and frontal bar 2 in this embodiment is as follows. First, in the same way as in the first embodiment, the constricted portion of the lens 1 is inserted upwardly from the lower portion of the hook 4. Then, the respective apertures 11 and 11 provided on the lens 1 are abutted onto the frontal surface of the bar 2 so as to be coincided with the corresponding holes 21 and 21 provided on the bar. Said shank portion 32a is inserted through the coincided locking hole 21 and aperture 11 from the ocular side of the bar while said socket portion 32b is inserted through the coincided aperture 11 and hole 21 from the frontal side of the lens 1, so that said shank portion 32a is received into said socket portion 32b within said coincided aperture and hole 11 and 21. The lens plate 1 is stably interlocked with the frontal bar 2 between said head portions 31a and 33b.

The sunglasses of this embodiment, the locking means of which comprises pair of mounting and receiving members, namely, a plug piece 3a and a sleeved socket 3b, further facilitates the insertion of the locking means through the coincided apertures and holes than that in the second embodiment, so that productivity increases.

(Fifth Embodiment)

Figure 7:
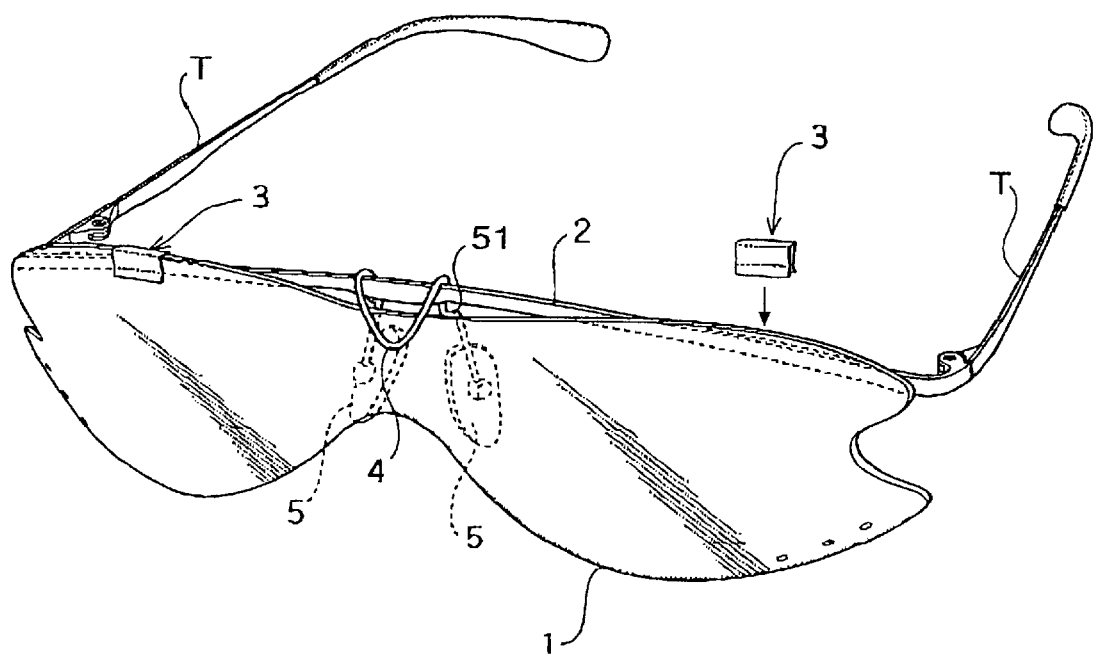
FIG. 7 is a perspective view of a pair of sunglasses of the fifth embodiment of the present invention showing the state where the lens plate is interlocked with the frontal bar via a pair of small clips.

FIG. 7 shows the sunglasses of the fourth embodiment of the present invention. The difference between the present embodiment and the above embodiments lies in the use of a small clip as a locking means to interlock the upper fringe of the lens plate 1 with the frontal bar 2.

Said clip is made of an elastic metallic plate, on which bending operation is performed, such that both ends thereof interpose an intervening object with elastic compression force. The interlocking method of the lens plate 1 with the frontal bar 2 via said clip 3 is as follows.

First, the constricted portion of the lens 1 is inserted upwardly from the lower portion of the hook 4 in the same way as in the fourth embodiment, so that the lens 1 and the frontal bar 2 are placed in their relative positions to each other. Then, said clip 3 is pushed between the upper fringe portion of the lens plate 1 and the frontal bar in such relative positions with the lower fringe portions of said clip 3 set apart from each other so as to intervene therebetween, so that the lens plate 1 is stably interlocked with said bar 2 by the elastic compression force of said clip 3.

In this embodiment, there is no need of providing an aperture 11 on the lens plate 1 or a hole 21 on the frontal bar 2, and the clip 3 is manufactured just by the bending operation performed on a metallic plate, so that the sunglasses of this embodiment is easy to assemble and the production parts thereof become lower in unit price, which enhances productivity.

It should be appreciated that the present invention is not limited to the above embodiments, but can be modified in various manners within the scope of the accompanying claims. In the respective embodiments as mentioned above, a glass, which is used for an ordinary sunglasses and intended for mitigating light, is exemplified as the lens 1, but it may be replaced with a polarized lens for fishing purpose or a lens to block ultraviolet and/or infrared rays hazardous to our health.

Further, in the above embodiments, a frontal bar 2 made of β-titanium is exemplified, but it may be a Ni—Ti based super elastic alloy, aluminum or German Silver and other metallic materials. Engineering plastics such as polyphenylene Sulfide Resin (PPS) is also available as far as elasticity and shape stability as required, are satisfied.

As described above, according to this invention, it enables sunglasses to be assembled in a stable manner by the three-points clamping system wherein a longitudinal lens plate is retained in front of the frontal side of the bar with a hook provided in the middle portion of said bar and the upper fringe portion of the lens plate, the frontal side of which is retained with said hook, is held onto the corresponding frontal surface of said bar with a locking means. In spite of the fact that the shape stability of the sunglasses of this embodiment is superb, the assembly parts thereof are streamlined as well as the interlocking mechanism thereof is simplified, so that the production cost is reduced to quite an extent.

Similarly, since the lens is removed from the frontal bar in such an easy operation as pulling off a locking means, it facilitates the replacement of one lens with another of different characteristics according to various occasions and lessens the burden on the part of the persons, especially the inexperienced, in charge of such replacement work. Likewise, a broken lens is exchanged in an inexpensive and easy manner.

As mentioned above, the lens interlocking mechanism as applied to the sunglasses according to this invention is so simple that the assembled sunglasses become light in weight and shapely in design. Thus, the sunglasses as assembled according to the present invention is of high industrial applicability in view of its practical and economical aspects, bringing high productivity and highly sophisticated design to the industry.

What is claimed is:

1. Sunglasses with readily detachable lens comprising:
   a frontal bar made of a thin rod material and formed such that said bar extends in alignment with the eyebrows of a human face;
   a longitudinal lens plate supported on said frontal bar and formed into a size enough to cover both eyes;
   a temple axially supported on each end of said frontal bar such that it is collapsible and a nose pad suspended from a middle portion of said bar to an ocular side thereof;
   wherein a hook that retains an upper frontal surface of said lens plate is arranged in front of the middle portion of said bar and an upper fringe portion of each side of said lens plate is detachably fastened onto said frontal bar with a locking means.

2. Sunglasses with readily detachable lens according to claim 1, wherein an aperture is provided on the respective right and left upper fringe portions of said lens plate while a locking hole is provided on said frontal bar at its respective counterpart portions such that a first aperture corresponds to a first locking hole and a second aperture corresponds to a second locking hole when said lens plate is placed in a fixed position opposite to said frontal bar,
   wherein a locking means of rivet type pierces through said first aperture and locking hole as well as said second aperture and locking hole so as to interlock said lens plate with said frontal bar.

3. Sunglasses with readily detachable lens according to claim 1, wherein an aperture is provided on the respective right and left upper fringe portions of said lens plate while a locking hole is provided on said frontal bar at its respective counterpart portions such that a first aperture corresponds to a first locking hole and a second aperture corresponds to a second locking hole when said lens plate is placed in a fixed position opposite to said frontal bar,
   wherein a shank portion of a locking means formed into a dumbbell shape is retained within said first aperture and locking hole as well as said second aperture and locking hole while the respective flange portions disposed on each end of said locking means interpose a frontal surface of the lens plate and a rear surface of the frontal bar so as to interlock said lens plate with said bar.

4. Sunglasses with readily detachable lens according to claim 1, wherein an aperture is provided on the respective right and left upper fringe portions of said lens plate while a locking hole is provided on said frontal bar at its respective counterpart portions such that a first aperture corresponds to a first locking hole and a second aperture corresponds to a second locking hole when said lens plate is placed in a fixed position opposite to said frontal bar,
   wherein a locking means comprising a plug piece and a sleeved socket is fitted into said first aperture and locking hole as well as said second aperture and locking hole while at the same time said plug piece is put into said socket so as to interlock said lens plate with said frontal bar.

5. Sunglasses with readily detachable lens according to claim 1, wherein a clipping means, each lower end of which is elastically energized to a mutual closure position, is interposed between the respective upper fringe portions of said lens plate and the frontal bar while the middle portion of said lens plate is retained with the hook suspended to the frontal side of said bar.

6. Sunglasses with readily detachable lens according to claim 1, wherein a decoration tape is symmetrically attached on the lens plate at its respective right and left surfaces.

* * * * *